May 28, 1957 L. C. ERICKSON 2,793,738
KNOCK-DOWN CONVEYOR GALLERY
Filed Nov. 27, 1953 2 Sheets-Sheet 1
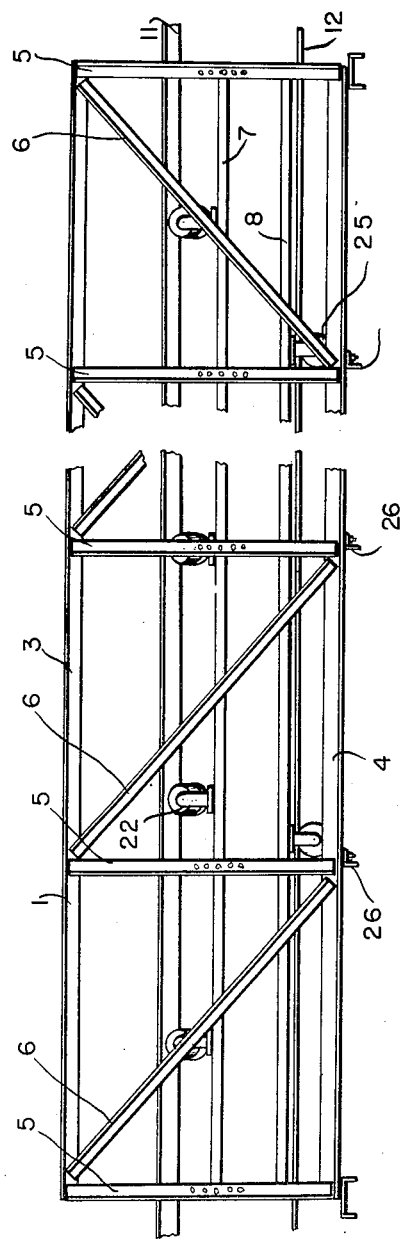
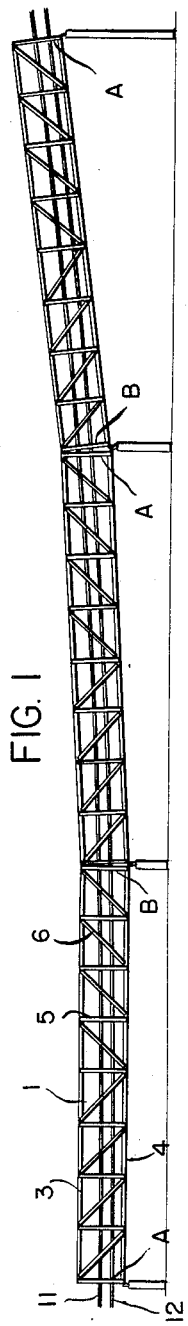
INVENTOR.
LEWIS C. ERICKSON May 28, 1957     L. C. ERICKSON     2,793,738
KNOCK-DOWN CONVEYOR GALLERY Filed Nov. 27, 1953     2 Sheets-Sheet 2

*INVENTOR.*
LEWIS C. ERICKSON
BY
Richard P. Cardew
AGENT

2,793,738
KNOCK-DOWN CONVEYOR GALLERY

Lewis C. Erickson, Duluth, Minn.

Application November 27, 1953, Serial No. 394,803

2 Claims. (Cl. 198—184)

This invention relates to a gallery for heavy duty conveyor belts such as are used for transporting earthy materials, or the like, from a loading station to an unloading station.

It is usually necessary to provide a so-called gallery for supporting heavy duty conveyor belt mechanism between the head and tail pulleys thereof, the galleries being supported on suitable pillars, standards, or the like, at intervals throughout the length of the conveyor installation. Conveyor galleries are usually made in sections forty feet long and of any required width. The forty-foot sections are joined together to provide the necessary length of gallery, and the supporting pillars are usually located at the junction between adjacent sections. Conveyor galleries must have suitable trussing or bracing to provide the necessary strength to support the weight of the conveyor mechanism and insure vertical stability, and also must be provided with so-called wind bracing to insure the structure's lateral stability.

It has been common practice to form conveyor gallery sections in a closed rectangular or box-like shape in cross section, with the four sides of the rectangle permanently united so that each side of the box structure becomes a truss panel. This practice is usually followed in trussing the rectangular gallery sections so that the lateral and vertical stability will be obtained. These rectangular conveyor galleries have certain disadvantages which have heretofore not been overcome. Some of these disadvantages are:

(A) The gallery sections are heavy and require an excessive amount of space when being shipped, or stored, thereby making it unprofitable to transport the gallery sections any great distance.

(B) The conventional conveyor galleries because of their closed rectangular or box-like construction, are difficult to work with or in when installing or maintaining the conveyor installation.

(C) With the closed rectangular conveyor gallery the loading station for the conveyor belt must be separate from the gallery and located outside of the gallery. That is, the gallery necessarily must end in spaced relation to the end of the conveyor so that sufficient room is provided for loading the conveyor outside of the gallery.

(D) The belt take-up, or tensioning mechanism, cannot be conveniently mounted in the area of the conveyor gallery because of the closed construction of the gallery wherein the removal of certain trusses and chords to permit the installation of the take-up, or tensioning mechanism, would result in a weakened gallery which would not be sufficiently safe to operate.

(E) The conventional conveyor gallery is relatively expensive to manufacture for it requires a great deal of labor and material.

(F) In conventional gallery construction the idlers for the conveyor belt must be shimmed up in order to permit the conveyor to be operated on a vertical curve, making the installation more difficult and less neat in appearance than is desirable. In the industry there has been an attempt to standardize on the length of a section of gallery, in this case forty feet, which limits the minimum radius allowable on a vertical curve and still keeps the belt within the straight gallery section without having either load or belt interferring with the top and/or bottom cross members of the gallery.

(G) Walk-ways along conventional galleries are difficult to install and require excessive additional shipping space.

It is, therefore, one of the principal objects of my invention to provide a conveyor gallery construction which overcomes the above mentioned disadvantages of conventional conveyor galleries.

Another object is to provide a conveyor gallery which can be shipped or stored in a knocked-down condition so that materially less space will be required for shipment of the gallery so that it may be profitable to ship same for long distances.

Another object is to provide a knock-down conveyor gallery which is easy to assemble.

Another object is to provide a conveyor gallery with a self-cleaning deck wherein the latter serves as part of the bracing mechanism for the gallery.

Another object is to provide a conveyor gallery wherein the loading of the conveyor may take place within the gallery and wherein the take-up mechanism may be mounted in the area of the gallery without weakening the structure, thereby providing for a less expensive conveyor installation in that a separate support structure need not be provided to support the conveyor elements at the loading stations, or at the belt tensioning location.

Another object is to provide a conveyor gallery wherein the idler supporting section is a separate unit from the vertical supporting side frame members and the gallery may be so assembled that the separate idler supporting unit may be secured in place following the vertical curve of the conveyor belt, the idler supporting sections being made in shorter lengths than the side sections.

Another more specific object is to provide a knock-down conveyor gallery wherein the vertical supporting mechanism is embodied in two separate side frame units which are normally carried in spaced relation to each other, and wherein the wind bracing and idler supporting mechanism is embodied in a third unit, the units to be assembled at the site of operation of the conveyor installation.

Another object of this invention is to provide a conveyor gallery wherein the walkways may be shipped in a nonassembled condition and may be readily and conveniently installed at the site of operation.

Another object is to provide a knock-down conveyor installation having a central unit including a deck of a predetermined shape whereby the latter may be employed as either a trough or as a self-cleaning deck.

Another object is to provide a conveyor gallery which is relatively inexpensive to manufacture and which lends itself to convenience in manufacture in that the side frame units are all identical and the central unit may be made in various widths for assembly with the side frame units to accommodate different widths of belts. These and other objects and advantages of my invention will become more apparent as the description proceeds.

In the accompanying drawing forming a part of this invention, Fig. 1 is a reduced side elevational view of a portion of a conveyor gallery installation of same mounted on a slightly vertical curve.

Fig. 2 is a broken side elevational view of one of the gallery sections showing the conveyor belt and idlers in place.

Figure 6:
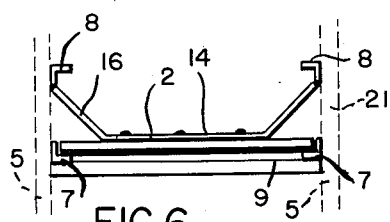

Fig. 6 is an end view of a central unit illustrating how the unit may be mounted in an upside down position, as compared to the other figures here shown, so that the inverted deck will serve as a trough to catch spillage from the upper strand of the belt, and water, or the like, may be used to wash the spillage down the length of the conveyor from the upper end thereof to the lower end where any suitable means may be provided to carry off the water and spillage before it reaches the end pulley.

Figure 7:
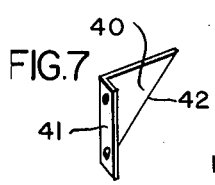

Fig. 7 is a prespective view of an angle brace for rigidfying the gallery, the brace to be welded to the inclined walls of the deck member and secured, by means on the flange, to the vertical webs of the side frames.

In the drawing the reference numeral 1—1 indicates the side frame sections of my conveyor gallery, and the numeral 2 indicates the center section thereof.

Figure 3:
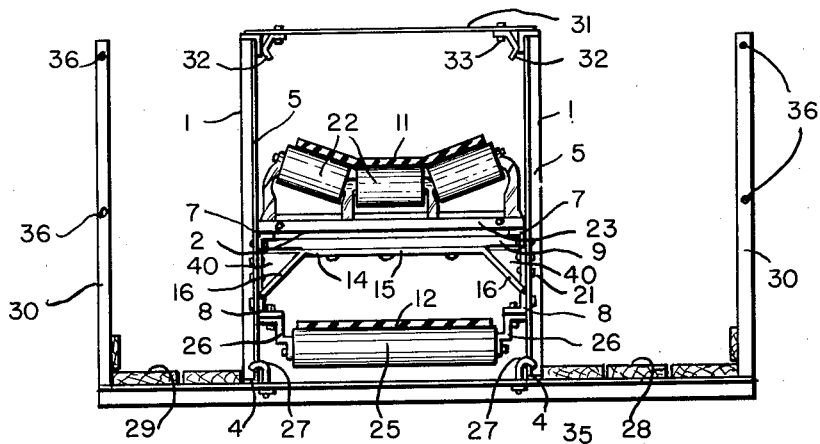
Fig. 3 is a vertical sectional view through a conveyor gallery shown in Fig. 2 showing the walkway mounted thereon.

Each of the side frame sections is identical to the others, and they are reversible so that they may be used on either the right or the left side of the gallery as will become apparent. Each of the sections 1 is of the same length as the others, and it is preferred that this length be about forty feet. Each section 1 comprises an upper longitudinal chord 3 and a lower longitudinal chord 4, the chords 3 and 4 being carried in spaced parallel relation to each other. The chords 3 and 4 are preferably angle irons as shown in Fig. 3, as are the web members of the sections.

The web members of the sections comprise a plurality of angle irons 5—5 fixed between the chords 3 and 4 and extending normally thereto. The members 5 are spaced equidistance apart, as shown, and, of course, are of equal length to hold the chords in spaced parallel relationship to each other. Diagonal brace 6—6 is provided between opposite ends of adjacent members 5—5. As shown, it is preferable that the diagonal braces on one half of a side frame unit incline in one direction, and the diagonal braces on the opposite or other half of the section incline in the opposite direction, see Fig. 1 and 2. In this manner the webbing and the chords provide a strong and rigid frame which, when carried in a vertical position, as shown in the drawings, will provide adequate strength to support the conveyor mechanism.

It will be readily seen that because the diagonal bracing 6 is arranged with opposite inclinations on each half of each of the side frame sections, the latter may be used on either the left or the right side of the conveyor gallery. This arrangement permits a single jig to be used for the construction of both left and right hand side frame sections, thereby insuring a minimum manufacturing cost. The angle irons from which the side sections are made preferably are so disposed that the face of the sections which are innermost have a flat face of the angle irons exposed, rather than an edge of an angle iron, the purpose of which will become apparent.

The central section of the gallery comprises, preferably, a plurality of similar segments of equal length which may be joined together to form a central section of the same length as the side frame sections. The segments of the gallery are relatively short in length, preferably about five feet long for use in gallery sections of forty foot lengths. Thus the individual adjacent segments of the central section may be joined at each of the vertical webs 5 in any desired vertical curve relative to the chords 3 and 4 of the sections 1. Each of the segments comprises four angle irons which are substantially the same length as the chords 3 and 4, and are arranged in spaced parallel relationship to each other, to form the chords for the central section 2. The angle irons, or chords, are so placed that they form the corners of a rectangle, see Figs. 4 and 5, when looking at the central unit in cross-section.

The upper angle irons, or chords, are indicated by the numeral 7—7, and the lower chords are indicated by the reference numeral 8 in Figs. 2, 3, 4 and 5. In Fig. 6 the inverted central section shows the lower chords as being 7 and the upper chords as being 8.

Figure 4:
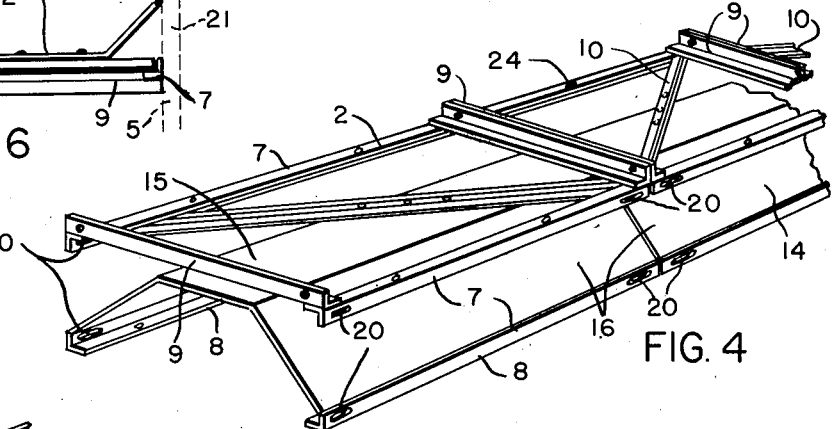
Fig. 4 is a fragmentary perspective view of the central unit of the conveyor gallery which supports the idlers and includes the wind bracing and the angular bracing for rigidifying the gallery.
Figure 5:
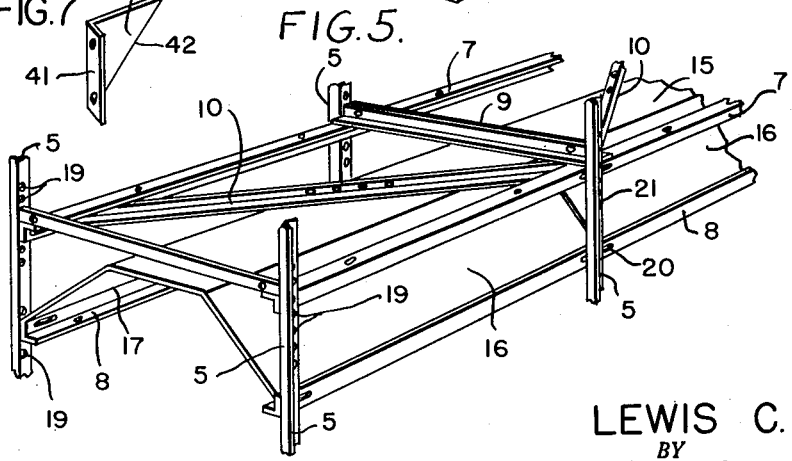
Fig. 5 is a view similar to Fig. 4 but showing the adjustable mounting of the central unit on the vertical members of the side frame sections to accomplish both height adjustment and vertical curve adjustment.

The upper chords 7—7 are joined by transverse webs 9—9 at each end of each segment of the gallery. The webs 9—9 normally lie horizontal when the gallery is installed, and are made of angle iron and secured between the chords in normal relation thereto as shown. Between adjacent webs 9 of each segment, diagonal webs 10—10 are provided, braces of adjacent segments being disposed in opposite directions to each other as shown in Figs. 4 and 5. The diagonal bracing or webs 10 in conjunction with webs 9 serve as wind bracing to provide lateral stability for the assembled gallery.

As is well known, it is desirable to provide a conveyor installation with suitable means to prevent spillage from the upper strand 11 of the conveyor belt from reaching the lower strand 12 of the conveyor belt, and various means have been employed to accomplish this purpose. I have provided a self-cleaning deck which will deflect spillage from the upper strand away from the lower strand. The deck 14 comprises an elongated hood having a substantially flat central portion 15 and opposed side walls 16—16 which extend at a downward inclination, as shown in Figs. 3, 4 and 5 from the central portion 15. The deck 14 is preferably made of relatively light weight sheet metal, with the sides 16 bent in angular relation to the central portion. The completed, or formed, deck 14 is of such width that the outer edges 17—17 thereof may be welded securely to the upper edge 18 of the lower chords 8. The central portion 15 of the deck is of less width than the width of the conveyor belt carried in the gallery (see Fig. 3), and is secured to the webs 9 and 10 as shown.

Thus, it will be seen, that each segment of the central section 2 of the gallery is a complete unit capable of being handled separately from the side sections and they may be joined at the point of the gallery installation. Because the central section is relatively thin, it will require very little space for storage or shipment.

The vertical web members 5 may be provided with a plurality of vertical spaced openings, or holes, 19—19, and the chords 7—7 and 8—8 are provided with longitudinally extended slots 20—20 at each end thereof to permit the assembly of the gallery segments to the side frame sections for maximum efficiency in assembly and strength in the completed mechanical structure of the gallery. Suitable bolts may be extended through the slots 20 and an adjacent hole 19 to secure the gallery in assembled relationship. It is deemed apparent that the spaced openings 19 in the webs 5 and the slots 20 and the chords 7 and 8 will permit the adjustment of the position of the segments of the central section of the gallery relative to the chords 3 and 4 of the side frame to follow a vertical curve within each gallery section, and, in assembling a plurality of assembled sections 1—2 to operate the conveyor on a vertical curve, as shown in Fig. 1, the segments of the central section may be closer to the lower chord 4 of the side A of the frame, Fig. 1, than it is at the opposite end B of the frame, Fig. 1. This arrangement will eliminate the need for shimming of the idlers of the conveyor belt operated on a vertical curve.

While I have shown the gallery sections 1—2 assembled by means of bolts, it is deemed apparent that they may be welded together if desired. In many installations welding may be preferred to bolting in the assembly.

It is deemed apparent that the connection of the chords 7 and 8 of the central section 2 to the webs 5 of the side frames, will provide a vertical brace 21 between the chords 7 and 8 of the central section, and because of the rigid fastening of the parts, the brace 21 will serve to rigidify the central section 2. As may be clearly seen in Fig. 3, the angularly disposed side walls 16—16 of the deck serve as angular bracing from the lower end of the central section to a point intermediate of the central section. This arrangement provides for rigidity in the gallery, of course.

In Fig. 7 I have shown a substantially triangularly shaped bracket 40 which may be used to further rigidify the angle bracing provided by the walls 16—16. The edge 42 of the bracket may be welded directly to the inclined wall 16, see Fig. 3, and the flange 41 on the adjacent, normally-vertically-disposed edge of the bracket may be bolted, or welded, to the brace portion 21 thus providing strong angular support for the gallery.

As shown in Fig. 3, the idlers 22 for the upper strand 11 of the conveyor belt are carried on a bracket 23, and the bracket 23 is secured to the chords 7—7 of the central section of the gallery by means of bolts, or the like, extending through suitable openings 24—24. The idlers 22 are, of course, put in place after the gallery has been assembled, and they, too, may serve to rigidify the central section of the gallery though that is not their primary purpose. The idlers for the upper strand 11 are placed in predetermined spaced relation to each other along the length of the gallery to support the belt in the conventional manner.

The idlers 25 for the return strand 12 of the belt are preferably hung by suitable brackets 26—26 secured to the lower chord 8 of the central section, as shown. They, too, being installed after the gallery has been assembled and the belt is in place.

The above described structure comprises the basic effective gallery which serves the desired purpose of providing support for the conveyor belt and its necessary operating appurtenances.

It is desirable to have a walkway running the length of the conveyor gallery to permit the inspection and maintenance of the conveyor installation in areas where the gallery is in elevated relation to the terrain over which it passes. Obviously, no walkways are required where the gallery runs close to the ground. In my invention I provide for this walkway by fastening a length of angle iron 26 transversely between the lower chords 4—4 of the side sections. The angle iron is secured in place by means of hook bolts 27—27, as shown, and is of greater length than the width of the gallery, as shown. It is preferred that the angle iron 26 extend further beyond the gallery on one side thereof than the other to provide for a main walkway 28 and an auxiliary walkway 29, as shown. A plurality of walkway supports 26 are provided along each gallery section or unit, the walkway supports being spaced apart along the length of the gallery at predetermined intervals whereby planking, or the like, may be installed between the spaced supports 26 to provide a walkway.

On each end of the walkway support member 26 an angle iron standard 30 is provided to extend in normal relation to the walkway support 26. The standard 30 is provided with space openings 36—36 through which galvanized cable, or the like, may be extended from one standard to the next to provide side rails for the walkway and prevent a workman's falling from the gallery when working thereon.

Obviously, the addition of the walkway supports 26 to the gallery sections will also strengthen same and the total structure will be very rigid and yet of relatively light weight, as compared with conventional gallery sections because of the fact that less material is required in the construction of my gallery sections, and more efficient use of the material that is used is provided in my novel arrangement of the parts whereby they cooperate to form an effective light weight and knock-down gallery.

In addition, it will be noted that the upper sides of the conveyor gallery will be open. This arrangement of open top, permits the conveyor belt 11—12 to be loaded within the gallery, for there is plenty of room for side skirts to be mounted (as are required for loading the upper strand of the belt) within the gallery. This feature eliminates the need for a separate supporting mechanism for the conveyor appurtenances at the loading station, and thus reduces the overall cost of the conveyor installation by eliminating the need for a separate manufacture of supporting structure at the loading station.

In addition, it is to be noted that the underside of the gallery is open except where the walkway supports 26 cross the gallery in spaced intervals. This arrangement permits the installation of belt take-up mechanism at the gallery. As is well known, it is common practice for the belt take-up mechanism to require that the belt be looped downwardly and a suitable tensioning means, such as a weight secured to a pulley, be employed to apply the necessary tension to the belt. With the open bottom gallery it is a simple matter to take the return strand 12 of the belt out of the gallery in a take-up loop, without impairing the structure of the gallery in any way. In a conventional conveyor gallery some of the trussing and bracing would necessarily have to be removed in order to place the take-up mechanism in the area of the gallery, and special conveyor supporting structure must be provided at the take-up location.

In addition, it will be apparent that my open gallery will permit easier access to the conveyor belt for maintenance and inspection, as well as installation or belt changing.

It may be seen, especially from Fig. 3, that spillage from the upper strand 11 will engage the angularly disposed side wall 16 of the deck 14 and will be deflected out of the gallery and onto the walkway where it is easily picked up by means of a shovel, or the like, and placed back on the conveyor through the open top thereof. It is thus insured that the return strand 12 will not carry any objects thereon which might cause damage to the belt when the tail pulley is reached.

In Fig. 6, I have shown a fragmental view of the conveyor gallery illustrating the central section thereof mounted in an inverted position wherein the self-cleaning deck 14 now serves as a trough to collect any spillage from the upper strand of the belt, the idlers 22 would then be mounted on the chords 8 and the idlers 25 would be mounted on the chords 7, of course. With the deck 14 in use as a trough, the spillage collected therein can be washed down the inclined gallery by means of water, or the like, so that the spillage could be collected at the lower end of the gallery by any suitable means, not shown. It is deemed apparent that the deck sections 14 would be interconnected by a suitable overlap, not shown, where the adjacent gallery sections are joined to cause a continuous through for collecting spillage and carrying same to a common collecting point.

As shown in Fig. 3, it may be desirable to provide a roof or cover 31 for the open upper end of the conveyor gallery to prevent rain or snow from collecting on the belt and the material carried thereon. With my open gallery construction the application of a roof is a very simple matter, for all that is required is elongated strips of sheet metal cut to any required width and length. Spring clips 32 may be secured to the roof 31 as by rivets 33, or the like, so that the roof sections 31 may be held in place by the contact of the spring clips 32. The roof sections can be overlapped at their adjacent ends to provide the overlap required to eliminate leakage at the joints.

Having thus described my invention, what I claim is:

1. In a conveyor gallery section; a pair of open side frame members having webbing to provide vertical support for said section, and a central member secured between said side frame members to hold the latter in fixed spaced relation to each other, said central member including longitudinal chords forming the lateral limits of said central section, webbing disposed between said chords to provide lateral bracing for said gallery section, said chords being carried by said webbing intermediate the upper and lower edges of said side members, and diagonal bracing means secured to and extending from said last mentioned webbing to said first mentioned webbing to provide rigidity for said gallery section and said central member being made up of a plurality of relatively short segments joined together in end to end relationship to substantially match the length of said side fram members.

2. A conveyor gallery section comprising a pair of side frame members having webbing to provide vertical support for said section, a central member, and means to secure said central member longitudinally of and to and between said side frame members to hold the latter in spaced relation to each other, said means including four chords arranged in rectangularly spaced relation to each other, transverse and diagonal webbing in said central member between at least two laterally spaced ones of said chords to provide wind bracing for said gallery section, a deck member secured along its longitudinal central portion to said webbing and including oppositely disposed side walls extending in angular relation from said central portion, the outer edges of each of said side walls being secured to one of the other laterally spaced ones of said chords whereby said side walls provide angle bracing for said gallery section when the latter is assembled and said central member being made up of a plurality of relatively short segments joined together in end to end relationship to substantially match the length of said side frame members.

References Cited in the file of this patent
UNITED STATES PATENTS

| | | |
|---|---|---|
| 1,355,308 | Brown | Oct. 12, 1920 |
| 1,459,524 | Wright | June 19, 1923 |
| 2,647,617 | Spurgeon et al. | Aug. 4, 1953 |

FOREIGN PATENTS

| | | |
|---|---|---|
| 423,449 | Great Britain | Feb. 1, 1935 |